June 5, 1962  W. A. MULHERN  3,037,816
WHEEL TRIM
Filed Oct. 13, 1958  2 Sheets-Sheet 2
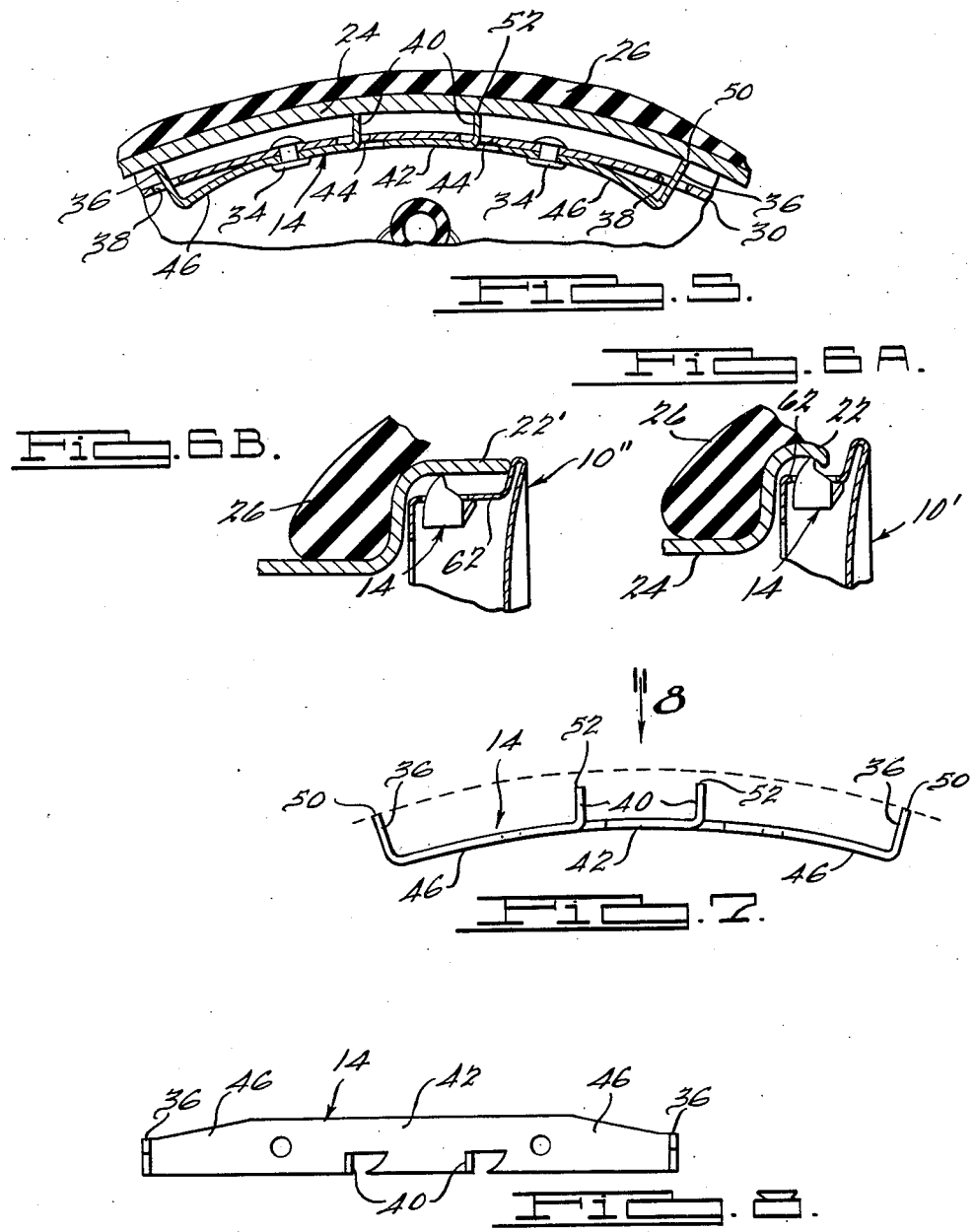
INVENTOR.
William A. Mulhern
BY
Harness, Dickey & Pierce
ATTORNEYS

United States Patent Office 3,037,816
Patented June 5, 1962

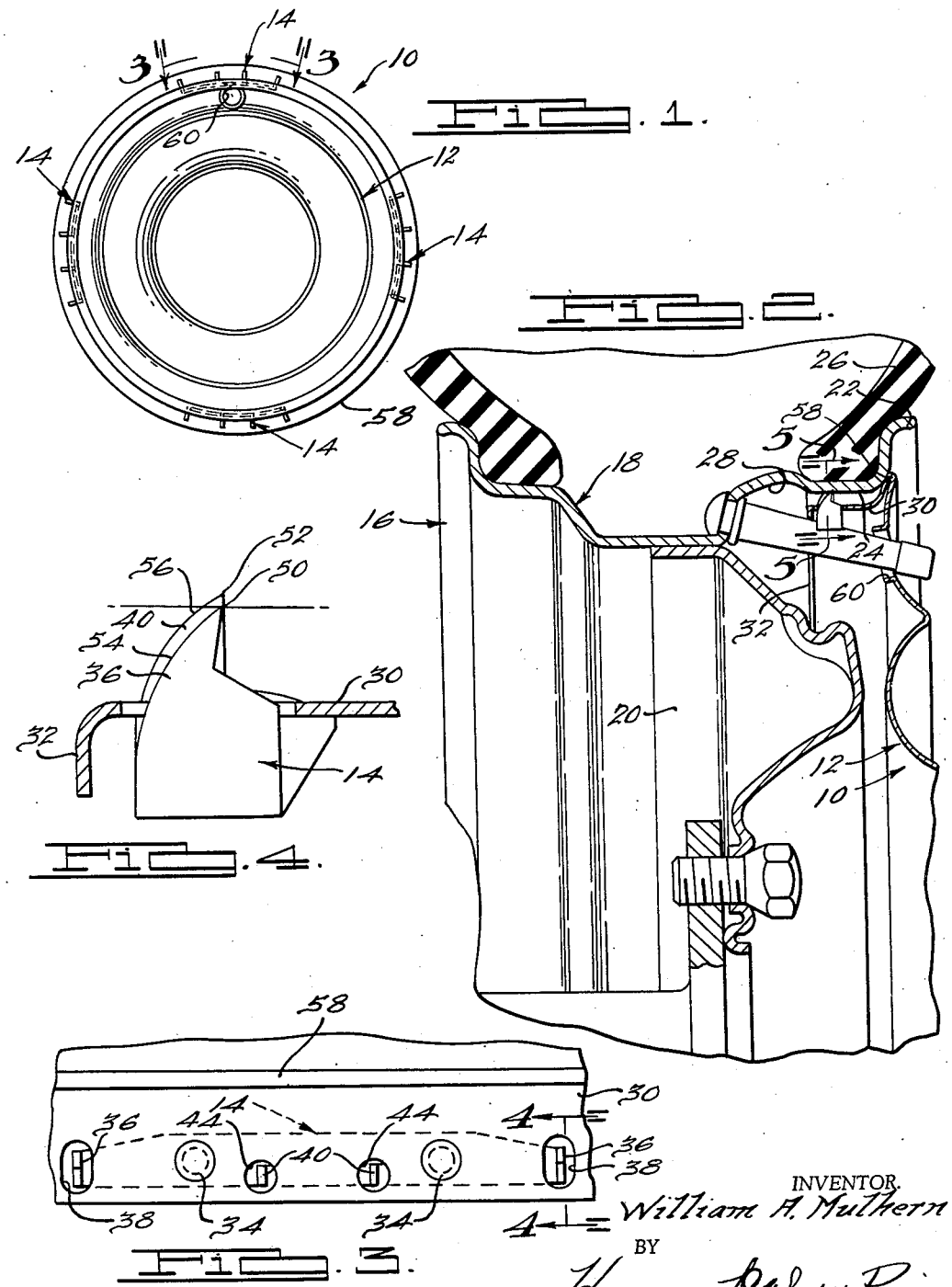

3,037,816
WHEEL TRIM
William A. Mulhern, Detroit, Mich., assignor to Gar Wood Industries, Inc., Wayne, Mich., a corporation of Michigan
Filed Oct. 13, 1958, Ser. No. 766,997
3 Claims. (Cl. 301—37)

This invention relates to an improved wheel trim assembly including an ornamental and protective member for application on the outer side of a vehicle wheel, and more particularly to such an assembly including an improved biting-type finger arrangement for holding the member upon the wheel.

One important object of the present invention is to provide an improved wheel trim assembly including an improved arrangement for retaining the assembly on a vehicle wheel.

Other objects and advantages of the invention are: to provide an improved wheel trim assembly including a retaining finger structure capable of securely holding the trim on a wheel, preventing indexing, yet permitting the trim to be readily removed from the wheel for servicing; to provide an improved trim assembly of this type which is readily adaptable for use with all presently used commercial types of automobile wheels; to provide an improved finger arrangement capable of holding a trim member securely upon an automobile wheel without indexing even in rough road service during which the wheel may be frequently distorted to a distinctly oval shape; to provide an improved wheel trim retaining structure including a rearwardly extending axial flange fixed to the trim member, biting type spring fingers mounted on the flange for retainingly engaging the rim of a vehicle wheel, and a fixed projection on the flange arranged to contact the wheel rim whereby in rough road service the fixed projections tend to distort the trim flange in response to the wheel distortion so that the spring fingers tend to follow the wheel and to remain always in fully tensioned engagement therewith; and in general to provide an improved wheel trim assembly which is of simple and rugged construction, dependable in service, and inexpensive to manufacture.

The foregoing and other objects and advantages of the invention will become apparent in the following detailed description of a preferred embodiment thereof, taken in conjunction with the drawings wherein:

FIGURE 1 is a rear elevational view of a wheel trim assembly according to a preferred embodiment of the invention;

FIG. 2 is a fragmentary cross-sectional view of the wheel trim assembly shown in FIG. 1, showing the assembly mounted upon a conventional automobile wheel;

FIG. 3 is a fragmentary plan view of the assembly shown in FIG. 1, taken along the line 3—3 thereof;

FIG. 4 is a cross-sectional view taken along the line 4—4 of FIG. 3;

FIG. 5 is a longitudinal section taken along the line 5—5 of FIG. 2;

FIG. 6A is a fragmentary cross-sectional view of a modified form of trim assembly according to the invention, showing the trim assembly adapted to engage the conventional curled terminal rim flange of the wheel;

FIG. 6B is a fragmentary cross-sectional view of another modified form of trim assembly according to the invention, showing the assembly mounted upon an automobile wheel of the type having a special, straight terminal rim flange, the trim assembly shown in this figure also being adapted to engage the terminal rim flange;

FIG. 7 is an elevational view of one of the retaining springs of the trim assemblies shown in the preceding figures; and FIG. 8 is a plan view of the spring shown in FIG. 7 taken in the direction of the arrow 8 thereof.

The wheel trim art is crowded with various arrangements for retaining protective and ornamental wheel covers or other devices upon the outer faces of vehicle wheels, yet each of the prior art arrangements, although solving some of the problems, leaves other problems unsolved or creates new ones. The design of a superior retaining arrangement is not a simple matter. It is important, for example, that the cover be securely retained upon the wheel during service, yet be readily removable to provide access to the face of the wheel. The retaining mechanism must be relatively inexpensive to manufacture, and preferably should not require any modification of the wheel structure itself. It is also highly desirable to make an arrangement suitable for universal application and capable of retaining a wheel cover on all different styles of automobile wheels, some of which are provided with safety grooves and ridges, others with cover retaining bumps of various sorts, and still others, of more recent manufacture, with a relatively long, straight, axially projecting terminal rim flange, which may be angled slightly inwardly.

The present invention represents a step forward in this field and provides a wheel trim retaining arrangement, which substantially overcomes all of the prior problems, is relatively inexpensive to manufacture, and yet provides exceptionally desirable retaining characteristics, and is applicable to many different types of vehicle wheels.

Referring now to the drawings, a wheel trim assembly 10 according to a preferred embodiment of the invention is shown therein, including a cover 12, which may be made of relatively thin sheet metal such as aluminum or stainless steel, and to which are attached a plurality of retaining springs 14. The assembly is illustrated in FIG. 2 mounted upon a conventional automobile wheel 16 having a drop center rim 18, which is rigidly secured to a load bearing body portion, or spider 20. The rim 18 includes a conventional, curled terminal flange 22, and an intermediate axial flange 24, which supports the pneumatic tire 26. The intermediate flange 24 may also include a safety hump 28 near its axially inner end as illustrated, and it should be noted that the retention of the trim assembly 10 on the wheel 16 is entirely independent of the safety hump 28.

The cover 12 carries a rearwardly extending axial flange 30, which is of smaller diameter than the intermediate rim flange 24 and is telescopically received therein. As shown, the axial flange 30 is integral with the cover 12, but, if desired, it may be made in a separate piece and attached to the cover by any desired means such as by crimping or welding. The axial flange 30 is made relatively strong, being rigidified in the illustrated embodiment by a radially inturned flange 32 at its rear edge, and by the rim portion of the cover 12 at its forward edge.

As perhaps best shown in FIG. 5, the retaining springs 14 are each secured on the radially inner side of the cover flange 30 by two spaced apart rivets 34. The ends of the springs 14 are turned outwardly and constitute retaining fingers 36 which extend through slots 38 in the flange into biting engagement with the wheel rim flange 24. Auxiliary retaining fingers 40 are lanced from the elongated body portion 42 of each spring between the two rivets 34, and project through slots 44, which are correspondingly located in the cover flange 30. The auxiliary fingers 40, being disposed between the two rivets 34, are fixed with respect to the upper flange 30 and are yieldable in a radial direction only to the extent of yieldability of the flange 30 itself. The end fingers 36, on the other hand, are cantilever supported by the portions 46 of the springs, which portions 46 extend outwardly beyond the rivets 34, and the end fingers 36 are therefore resiliently deflectable relative to the cover flange 30.

In their unsprung positions, as shown in FIG. 7, the end fingers 36 extend farther outwardly than do the auxiliary fingers 40, so that when the cover 12 is applied to the wheel 16, the end fingers 36 are deflected relative to the cover flange 30 and are resiliently urged by the spring portions 46 into pressure engagement with the rim flange 24. The tips 52 of the auxiliary fingers 40 are arranged on a circle approximately equal to but just greater than the diameter of the rim flange 24, which they engage so that when the cover is applied to the wheel, the auxiliary fingers 40 engage the rim flange 24, deflecting the cover flange 30 slightly, and being resiliently held against the rim flange 24 by the relatively strong resilience of the cover flange 30. Thus, each one of the springs 14 provides a four-point engagement between the cover 12 and the wheel 16.

As perhaps best shown in FIG. 4, both the sprung fingers 36 and the auxiliary fingers 40 are shaped to provide relatively sharp points 50 and 52, respectively, for biting into the rim flange 24. The rear edges 54 and 56 of the fingers 36 and 40, respectively, are slanted, or cam shaped to facilitate application of the cover upon the wheel. The fingers 36 and 40 are cammed radially inwardly to ride over the shoulder 58 at the axially outer end of the intermediate rim flange 24 as the cover is placed upon the wheel.

Now, it is old to provide a cantilever type leaf spring having radially outturned fingers for biting engagement with the wheel rim flange for retaining a cover on the wheel. However, the combination of this type of spring engagement with the auxiliary fingers 40, which are fixedly mounted upon the cover, improve the retention characteristics of the cover to an unexpected degree. This combination provides improved holding power during road operation without correspondingly increasing the difficulty of removal of the cover for servicing the wheel or noticeably changing the "feel" of application and removal. The improvement in retention characteristics has been demonstrated by the results of exhaustive tests, and appears to be due at least in part to the action of the auxiliary fingers 40, which distorts the cover flange 30 in response and in close conformity to the distortion of the wheel rim flange 24.

Considering the arrangement illustrated in FIG. 1, wherein four equally spaced spring 14 are mounted on the cover 12, when the wheel carrying the cover strikes a sharp road bump, it is distorted to an oval form, being vertically shortened and horizontally elongated. If the cover were equipped with the prior art spring finger arrangement, part of the vertical shortening would be absorbed by the top and bottom springs so that the cover flange 30 would not be distorted to the same degree as the wheel rim, and the spring tension on the front and back springs would be at least partly relieved with a consequent reduction of the holding power of the front and back springs, which may at times be completely withdrawn from engagement with the wheel. Now, if when this happens there is any torque about a vertical axis tending to twist the cover off the wheel, the retention of the front and back springs is relatively easily overcome, and in this way, the prior art covers can "walk" off a wheel.

In the present structure, on the other hand, the auxiliary fingers 40, being rigidly secured to the cover flange 30, distort the cover flange equally with the wheel rim, so that the front and back spring fingers 36 remain in substantially fully tensioned enagement with the rim gflange 24, and the cover is positively retained on the wheel regardless of the wheel distortion encountered.

The auxiliary fingers 40 also provide improved centering of the cover relative to the axis or rotation of the wheel, since they substantially eliminate the effects of differences between the dimensions and strengths of the different springs 14, and normally hold the cover positively centered relative to the wheel. In the prior art arrangements, for example, wherein the cover is supported only upon a number of sprung fingers, unavoidable differences among the springs often allow the cover to be held in an off-center position on the wheel. In the present arrangement, by contrast, the auxiliary fingers 40 can all be made of equal length so that they project equal distances beyond the cover flange 30, and thus assure positive centering of the cover within the limits set by the manufacturing tolerance of the cover flange 30.

The spacing of the two rivets 34 enables the radial force exerted on the auxiliary fingers 40 to be spread over a relatively wide portion of the cover flange 30, so that the cover flange 30 need not be made of excessively heavy stock, nor excessively reinforced. The cover flange 30 need only be about as strong as the corresponding flanges of prior art covers; that is, sufficiently strong to withstand flexing of the springs 14 without local bending.

The springs 14 are preferably mounted at 90° intervals around the cover, starting at the valve stem aperture 60 in order to avoid interference with radially inwardly struck bumps (not shown) such as are found on many commercial vehicle wheels spaced at 90° intervals and 45° offset from the valve stem.

The springs 14 may be arranged on many different types of wheel covers, or trim members for engaging any desired axially extending flange of the wheel. For example, the trim assembly 10' shown in FIG. 6A is arranged to cover the entire wheel and to overlie the terminal rim flange 22. In this case, the cover flange 62 is dimensioned to fit within, and the springs 14 are mounted to engage the terminal rim flange 22, which in the form illustrated is of the conventional radially inwardly curled type. In this arrangement due to the curl of the rim flange 22, the cover flange 62 and the springs 14 must yield farther during application and removal of the cover 10' than in the case where the springs engage a straight wheel flange such as the intermediate rim flange 24. The cam shaped edges 54 and 56 (FIG. 4) of the spring fingers are preferably made sufficiently long to insure smooth camming action through the full extent required for engagement with the curled flange 22 so that the springs 14 may be used interchangeably on the different types of trim assemblies. The cover flange 62 will normally be fully capable of yielding to the necessary extent without exceeding its elastic limit.

FIG. 6B illustrates a cover 10" arranged to be retained by engagement with a straight terminal rim flange 22', of the type which has recently appeared on the market, which may be either of straight cylindrical form or slightly tapered inwardly. The straight terminal flange 22' is regarded as a special form and has not as yet achieved wide commercial acceptance. It is shown, however, in order to emphasize the versatility of the trim retaining arrangement of the present invention, which can be easily adapted for engagement with any axially extending and inwardly facing flange of a vehicle wheel, whether the flange is straight or curled, and whether it extends around the outer edge of the wheel or is disposed inwardly of the edge.

The principal operating advantage of the retaining spring 14 of the present invention is due to the combined, cooperative effect of the sprung fingers 36 and the auxiliary fingers 40 during rough road surface operation. Under rough road conditions, an automobile wheel is repeatedly distorted to an oval shape, and may also be twisted; that is, bent about an axis perpendicular to its axis of rotation so that adequate retention is difficult to achieve without making it undesirably difficult to remove the cover from the wheel for servicing.

It has also been found that covers equipped with retaining springs 14 of the present invention retain their original "feel" of application to and removal from the wheel throughout their service lives, even though they are repeatedly removed and replaced many times. This characteristic is in marked contrast to most prior art covers, which tend to develop a "soft" or "sloppy" "feel" after a relatively short service life, and is probably due to the effect of the auxiliary fingers 40 in limiting the deflection of the spring fingers 36.

What is claimed is:

1. A wheel trim assembly for disposition on the outer face of a wheel of the type having an axially extending flange which is subject to distortion due to road shock impacts and the like during operation, said trim assembly comprising a circular body member, an annular flange secured to said body member and dimensioned to fit within the wheel flange, a plurality of leaf springs secured to said annular flange at spaced points therearound for retaining said trim assembly on the wheel, each one of said springs having end portions bent radially outwardly and shaped to bite into the wheel flange, said end portions being resiliently deflectable in a radial direction relative to said annular flange, and rigid auxiliary fingers struck from portions of said springs that are fixedly secured relative to said annular flange, said auxiliary fingers projecting radially outwardly into contact with the wheel flange, whereby said auxiliary fingers distort said annular flange in response and in close conformity to the distortion of the wheel flange and are thus effective to maintain substantially full tension on all of said spring end portions when the wheel is distorted.

2. A wheel trim assembly for disposition on the outer face of a wheel of the type having an axially extending flange which is subject to distortion due to road shock impacts and the like during operation, said trim assembly comprising a circular body member, an annular flange secured to said body member and dimensioned to fit within the wheel flange, a plurality of leaf springs disposed along the radially inner surface of said annular flange, means for rigidly attaching each one of said springs to said annular flange at two angularly spaced points, end portions of said springs spaced from said points of attachment being bent radially outwardly and projecting through said annular flange into contact with the wheel flange, the tips of said end portions being shaped for biting into the wheel flange to retain the trim assembly on the wheel, said end portions being spaced sufficiently far from said points of attachment so that they are resiliently deflectable relative thereto, said end portions also being longer than the normal spacing between the inner surface of said annular flange and the wheel flange so that said springs are stressed between said end portions and said points of attachment when the trim is mounted on the wheel, the central portions of said springs between said points of attachment being fixed relative to said annular flange by reason of the two point attachment arrangement, and auxiliary fingers lanced from said central portions and extending radially outwardly through said annular flange into contact with the wheel flange for distorting said annular flange in response and in close conformity to the distortion of the wheel flange such as may be occasioned by road impacts and the like in service, thereby to minimize variations in the spring tension urging said end portions against the wheel flange.

3. A wheel trim assembly for dispoistion on the outer face of a wheel of the type having an axially extending flange which is subject to distortion due to road shock impacts and the like during operation, said trim assembly comprising a circular body member, an annular flange secured to said body member and dimensioned to fit within the wheel flange, a plurality of leaf springs disposed at intervals along said annular flange for retaining said trim assembly on the wheel, each one of said springs including four radially outwardly projecting fingers spaced lengthwise therealong, the end ones of said fingers being longer than the intermediate ones thereof, means for rigidly attaching said springs to said annular flange at at least two points on each one of said springs, said two points being closely adjacent to said intermediate fingers and being spaced from said end fingers whereby said intermediate fingers are fixed relative to said annular flange and said end fingers are resiliently deflectable relative thereto, all of said fingers being shaped for biting retaining engagement with the wheel flange and being normally held in engagement therewith.

References Cited in the file of this patent

UNITED STATES PATENTS

| 1,889,070 | Hyatt | Nov. 29, 1932 |
| 2,698,203 | Landell | Dec. 28, 1954 |
| 2,732,262 | Buerger | Jan. 24, 1956 |

FOREIGN PATENTS

| 767,905 | Great Britain | Feb. 6, 1957 |